United States Patent [19]

Hsieh

[11] Patent Number: 4,735,061

[45] Date of Patent: Apr. 5, 1988

[54] ENERGY-SAVING SYSTEM FOR AN ENGINE-DRIVING AIR CONDITIONING SYSTEM

[76] Inventor: Sheng-Ming Hsieh, P.O. Box 10160, Taipei, Taiwan

[21] Appl. No.: 92,628

[22] Filed: Sep. 2, 1987

[51] Int. Cl.⁴ .................................................. F25B 27/00
[52] U.S. Cl. ................................... 62/238.1; 62/238.6; 62/323.1; 237/2 B
[58] Field of Search ................ 62/79, 323.1, 238.1, 62/238.6; 237/2 B

[56] References Cited

U.S. PATENT DOCUMENTS

| | | | |
|---|---|---|---|
| 3,247,679 | 4/1966 | Meckler | 62/323.1 |
| 3,401,530 | 9/1968 | Meckler | 62/323.1 |
| 3,721,104 | 3/1973 | Adler | 62/323.1 |
| 4,510,762 | 4/1985 | Richarts | 62/238.6 X |
| 4,614,090 | 9/1986 | Kaneko et al. | 62/238.6 |

FOREIGN PATENT DOCUMENTS 2160966  1/1986  United Kingdom ............... 62/323.1

Primary Examiner—Lloyd L. King

[57] ABSTRACT

An energy-saving system for an air conditioning system includes: a silencer box encasing an air compressor of an air conditioning system and an engine directly coupled with the air compressor, an air heat exchanger adapted for absorbing the heat as laden by an air stream passing the air compressor and the engine, a refrigerant heat exchanger recovering the condensation heat of the air conditioning system, a water heat exchanger recovering the heat as absorbed from the water jacket in an engine body, and a flue gas heat exchanger recovering the waste heat laden in the exhaust gas from the engine, so that all the heat recovered may serve to drive a turbo-generator for power generation, or to warm an utility water or to preheat a boiler feed water.

2 Claims, 2 Drawing Sheets

ENERGY-SAVING SYSTEM FOR AN ENGINE-DRIVING AIR CONDITIONING SYSTEM

BACKGROUND OF THE INVENTION

A conventional air conditioning system provided in a building generally has an air compressor driven by a motor powered by a municipal utility electricity. It will cause an energy conversion loss because the electrical energy must be first converted to a mechanical energy to drive the motor and the air compressor. When a power failure occurs, a standby power generator driven by a diesel engine is started to continuously supply electricity to the motor for driving such a compressor, which still causes energy conversion loss.

It is therefore expected to have an energy-saving system capably recovering the waste heat energy from an air conditioning system having an air compressor directly coupled to and driven by an internal combustion engine.

SUMMARY OF THE INVENTION

The object of the present invention is to provide an energy-saving system including a primary heat recovery apparatus recovering an environmental heat of a silencer box having an air compressor coupled with an engine commonly built in the box for warming utility water, a refrigerant hear recovery apparatus recovering the condensation heat of the refrigerant for warming utility water, a water heat recovery apparatus recovering the water heat in the water jacket of the engine, a flue gas heat recovery system having a first gas heat exchanger and a second gas heat exchanger for recovering the waste heat of the exhaust gas, and a turbo-generator driven by a steam turbine driven by the steam produced from the gas heat exchanger for generating self-supplying electricity.

DETAILED DESCRIPTION

Figure 1:
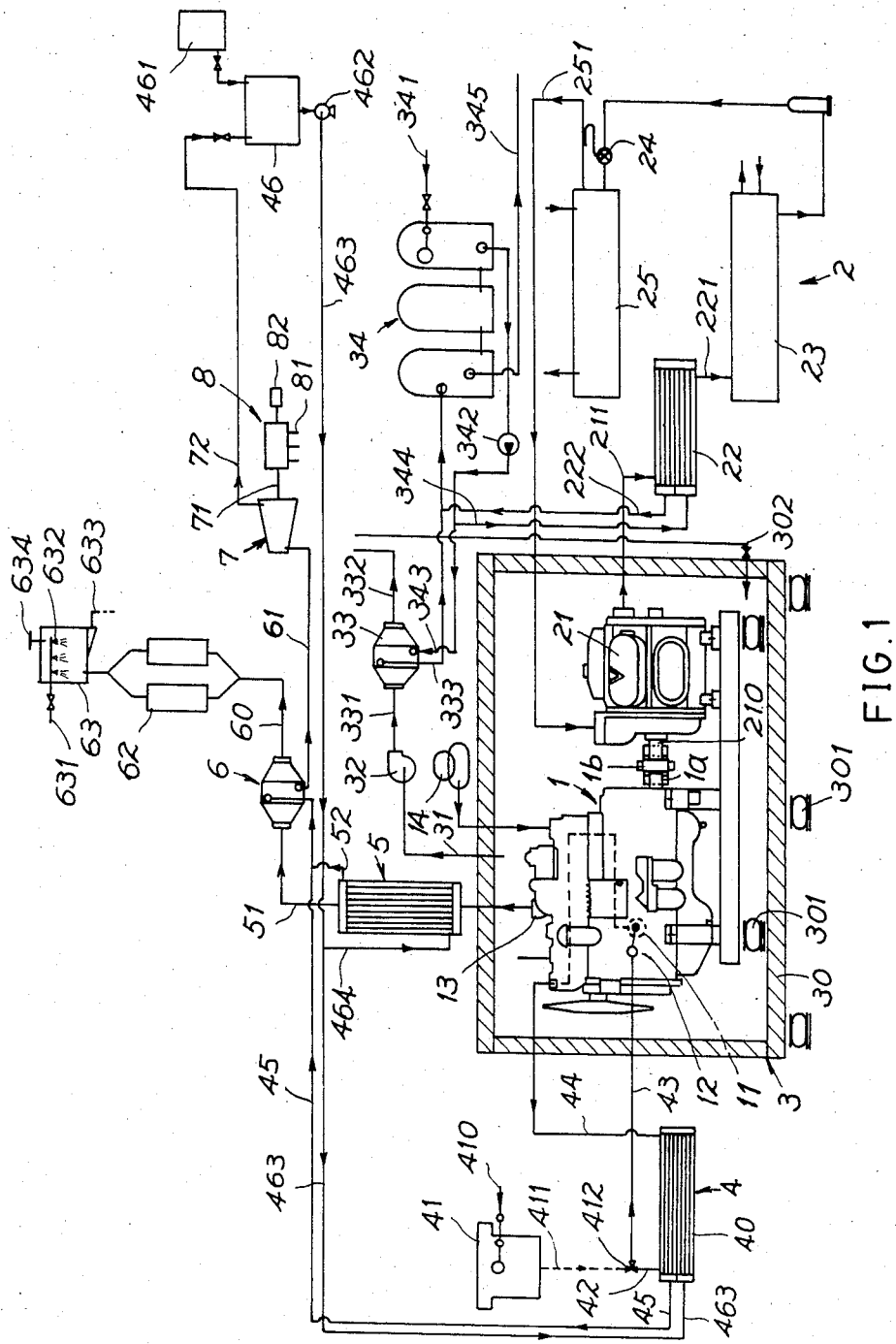
FIG. 1 is an illustration showing the systematic apparatus of the present invention.

As shown in FIG. 1, the present invention comprises: a primary heat recovery apparatus 3 for recovering an environmental heat of a silencer box 30 encasing an air compressor 21 of an air conditioning system 2 directly coupled to an engine 1 commonly built in the box 30, a refrigerant heat recovery apparatus 22 recovering the condensation heat of the refrigerant of the air conditioning system 2, a water heat recovery apparatus 4 for recovering the water heat of the engine water jacket 12, a flue-gas heat recovery system having a first gas heat exchanger 5 and a second gas heat exchanger 6 recovering the waste heat of the engine exhaust gas, and a turbo-generator 8 driven by a steam turbine 7 driven by the steam as produced from the second gas exchanger 6.

The primary heat recovery apparatus 3 includes: a silencer box 30 having its casing made of insulating materials (sound and noise insulation) for shielding the noise produced from the compressor 21 and engine 1 inside the box 30 and also preventing loss of heat transferred through the box casing, an air suction pipe 31 poking inside the box through an upper hole to direct hot air therefrom, an air entrance pipe 302 directing air into the bottom of box 30, an exhaust fan 32 sucking air outwardly through the pipe 31, an air heat exchanger 33 for recovering the heat of the environmental air directed from the box 30 and a hot water storage system 34. The hot water storage system 34 includes a feed water pipe 341 for feeding cold water into the system 34, a pump 342 pumping the cold water through a cold water inlet pipe 343 to the shell side of the air heat exchanger 33 for absorbing heat of the air as directed through a hot air inlet pipe 331 to the tube side of the heat exchanger 33 and exhausted through a cold air outlet pipe 332, a hot water outlet pipe 333 directed from the shell side of the exchanger 33 for leading hot water as heated through the exchanger 33 to the storage system 34 for supplying utility hot water or for preheating boiler feed water through the distribution pipe 345.

The air compressor 21 has its main shaft 210 coupled to the driving shaft 1a of the engine 1 selected from a diesel engine or a natural-gas fired engine by a coupling 1b. The compressor 21 and the engine 1 have their base supported on a cushioning device 301 for absorbing vibrational shock during the operation of the present invention for noise prevention.

The air conditioning system 2 is a conventional means, except the heat recovery apparatus 22, which includes: a compressor 21; a refrigerant heat recovery apparatus 22 which is a refrigerant heat exchanger having the compressed refrigerant directed from the compressor 21 to the shell side of the apparatus 22 through a hot refrigerant inlet pipe 211, having a cold water pipe 344 branched from the water pipe 343 for directing cold water into the tube side of the exchanger 22, having a warm refrigerant outlet pipe 221 for releasing the refrigerant of which the major condensation heat is absorbed by a water stream released from the hot water pipe 222 and directed to the storage system 34; a condenser 23 for further absorbing the condensation heat of the refrigerant released from the exchanger 22; an expansion valve 24 and an evaporator 25 adapted for evaporating the refrigerant liquid and a return pipe 251 directing the refrigerant vapor from the evaporator 25 to the compressor 21 to be compressed by the compressor 21 for next operation cycle.

The water heat recovery apparatus 4 includes: a water heat exchanger 40, a compensator of heat-transfer liquid 41 and a cold water reservoir 46. The water heat exchanger 40 includes: a liquid inlet pipe 44 directing a hot liquid flowing through the water jacket 12 formed in the engine 1 as pumped by a liquid pump 11 into the shell side of the exchanger 40, a first liquid outlet pipe 42 directing the cold liquid through a triple-pass valve 412 and a second pipe 43 to the water jacket 12 of the engine 1 for absorbing the engine heat, a cold water inlet pipe 463 directing the cold water into the tube side of the exchanger 40 to absorb the heat laden in the liquid as absorbed from the water jacket and engine body, and a hot water outlet pipe 45 directing the hot water to the shell side of the second gas heat exchanger 6. The compensator of heat-transfer liquid 41 is fed with a heat-transfer fluid selected from water or other liquids through an inlet pipe 410 and has an outlet pipe 411 for making up the liquid into the pipe 43 through the valve 412. The cold water reservoir 46 includes a cold water source 461 for supplying water into the reservoir, and a pump 462 pumping a cold water stream through a pipe 463 to the exchanger 40.

The flue-gas recovery system includes: a first gas heat exchanger 5 having a gas inlet pipe 13 communicated with the exhaust pipe of the engine 1 directing the hot exhaust gas into the tube side of the first exchanger 5, a gas outlet pipe 51 directing the exhaust gas to the tube side of the second gas heat exchanger 6, a cold water inlet pipe 464 branched from the pipe 463 directing the cold water into the shell side of the first exchanger 5, and a water outlet pipe 52 directing the hot water into the shell side of the second exchanger 6 in combination with the hot water as delivered from the water pipe 45 from the water exchanger 40; and a second gas heat exchanger 6 having a steam pipe 61 directing the steam as generated from the shell side of the second exchanger 6 to the steam turbine 7 for driving the turbine 7 and driving the turbo-generator 8, and an exhaust pipe 60 directing the flue gas through a muffler 62 and a scrubber 63 which is formed with several nozzles 632 for spraying water fed by an inlet pipe 631 for washing or removing the pollutants such as dust or other water-soluble poisonous gases laden in the gas. The pollutants are then drained by a lower valve 633 and the exhaust gas is released from an upper duct 634.

The turbo-generator 8 is driven by the steam turbine 7 by coupling the generator shaft to the turbine shaft 71 for generating power 81 for supplying electricity for uses in a building or a factory. The condensate for turbine 7 is delivered to the reservoir 46 by a condensate pipe 72. A starting motor 82 may be provided to help start the generator 8.

The heat exchangers as used in this invention are not limited so that besides the tubular heat interchanger, other types of exchangers such as double-pipe and spiral plate heat exchanger can also be used in this invention.

The present invention has the advantages superior to any conventional air conditioning systems since all kinds of waste heat, such as: the environmental heat produced by heat conduction, convection and radiation inside the silencer box 30, the heat produced from water jacket of the engine body, the refrigerant condensation heat and the waste heat of the flue gas exhausted from the engine, can be recovered for power generation, for heating utility water or for preheating boiler feed water for complete energy-saving purposes.

Figure 2:
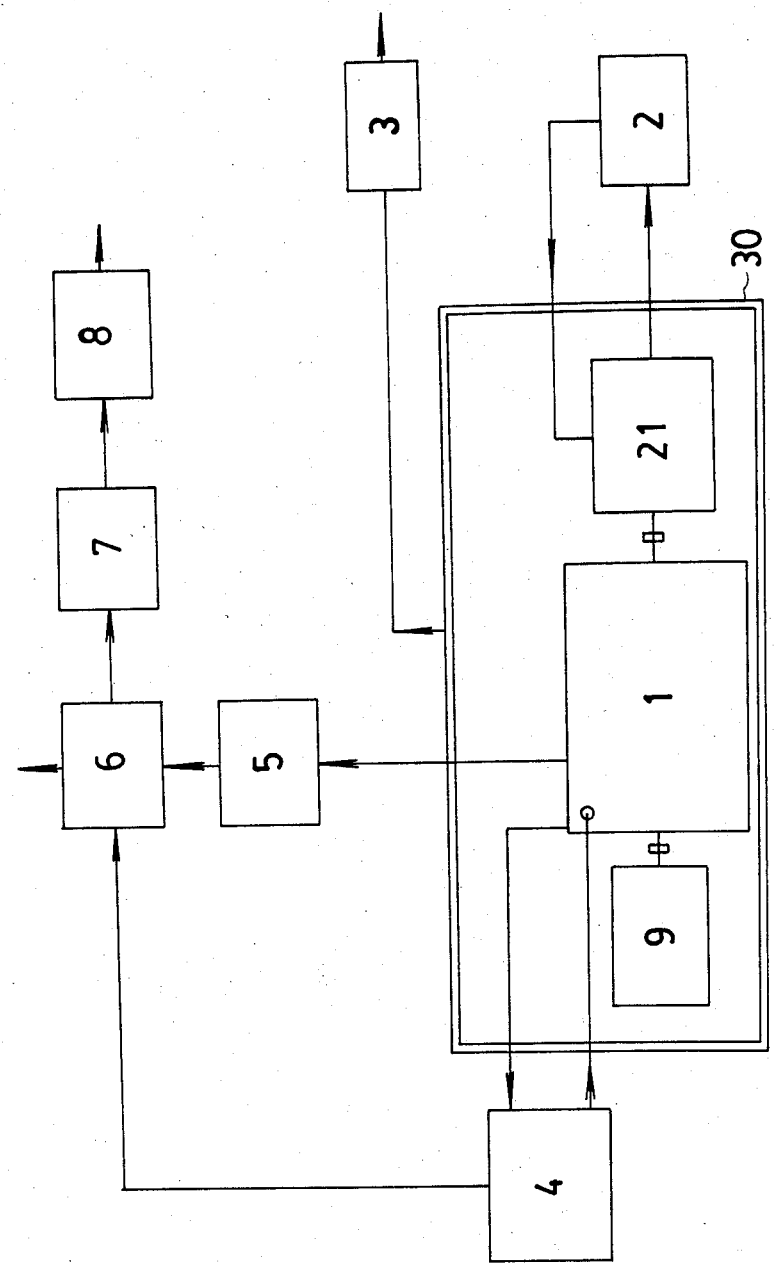
FIG. 2 is a block diagram showing an additional power generator encased in a silencer box of the present invention.

As shown in FIG. 2, if an additional power generator 9 is required to power some electrically-driving equipments, such as: a blower, an air cleaner, etc., utilized in an air conditioning system, such a generator 9 may be coupled to the other output end of the engine shaft 1a and may also be encased within the silencer box 30 of the primary heat recovery apparatus 3.

I claim:

1. An energy-saving system for an engine-driving air conditioning system comprising:
   a primary heat recovery apparatus for recovering an environmental heat of an air compressor of an air conditioning system and an engine;
   a refrigerant heat recovery apparatus having a refrigerant heat exchanger adapted for absorbing the condensation heat from a compressed refrigerant by the air compressor for warming a water stream;
   a water heat recovery apparatus having a water heat exchanger directed with a water stream therein for absorbing the water heat as absorbed from a water jacket in an engine body;
   a flue-gas heat recovery system including a first gas heat exchanger directed with a water stream therein for absorbing the heat of a flue gas as released from an engine exhaust pipe, and a second gas heat exchanger directed with the water stream as preheated in the water heat exchanger and the first gas heat exchanger into the second exchanger for further absorbing the heat of the exhaust gas for generating a steam; and
   a turbo-generator driven by a steam turbine as driven by the steam produced from the second gas heat exchanger for power generation;
   the improvement which comprises:
   said primary heat recovery apparatus including:
   a silencer box having its casing made of sound and thermal insulating materials and encasing the air compressor of the air conditioning system directly coupled to an engine, both said air compressor and said engine being commonly built in said silencer box; an air entrance pipe directing air into the bottom of the box; an air suction pipe poking inside said box through an upper hole on the box to direct the hot air therefrom;
   an exhaust fan sucking the hot air through said suction pipe, and an air heat exchanger which is directed with a water stream for absorbing the heat of the hot air from said box for warming the water or preheating a boiler feed water.

2. An energy-saving system according to claim 1, wherein a power generator is further coupled to said engine on one side of said engine opposite to said air compressor and encased in said silencer box of said primary heat recovery apparatus.

* * * * *